United States Patent
Hirota et al.

(10) Patent No.: US 10,573,264 B2
(45) Date of Patent: *Feb. 25, 2020

(54) DISPLAY DEVICE AND HEAD-MOUNTED DISPLAY

(71) Applicant: Japan Display Inc., Minato-ku (JP)

(72) Inventors: Takenori Hirota, Tokyo (JP); Jin Hirosawa, Tokyo (JP); Hidemasa Yamaguchi, Tokyo (JP); Yasuhiro Takahashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,528

(22) Filed: Sep. 7, 2018

(65) Prior Publication Data
US 2019/0073974 A1 Mar. 7, 2019

(30) Foreign Application Priority Data
Sep. 7, 2017 (JP) ................................ 2017-172350

(51) Int. Cl.
*G09G 3/36* (2006.01)
*G02F 1/1335* (2006.01)

(52) U.S. Cl.
CPC ..... *G09G 3/3648* (2013.01); *G02F 1/133512* (2013.01); *G02F 2201/123* (2013.01); *G09G 2320/0252* (2013.01)

(58) Field of Classification Search
CPC ............... G02F 1/133512; G02F 1/137; G02F 2001/134372; G02F 2001/13712; G02F 2201/123; G02F 1/13392; G02F 1/1395; G02F 1/134363; G09G 2320/0252; G09G 3/3648; C09K 19/3001; C09K 19/13; H01L 33/505; H01L 27/1225; G02B 26/10
See application file for complete search history.

(56) References Cited

U.S. PATENT DOCUMENTS 6,323,927 B1 * 11/2001 Hiroshi ............. G02F 1/134363
349/141
6,429,918 B1 * 8/2002 Choi ................. G02F 1/134363
349/111
6,469,764 B1 * 10/2002 Kim .................. G02F 1/134363
349/141

(Continued)

FOREIGN PATENT DOCUMENTS

JP 2007-025666 2/2007
JP 2010-217853 9/2010

*Primary Examiner* — Richard J Hong
(74) *Attorney, Agent, or Firm* — Oblon, McClelland, Maier & Neustadt, L.L.P.

(57) ABSTRACT

According to one embodiment, a display device comprises first and second substrates and a liquid crystal layer. The first substrate includes a pixel electrode and a common electrode. The second substrate is opposed to the first substrate. The liquid crystal layer is between the first substrate and the second substrate. A frame frequency for rewriting a voltage of the pixel electrode is 80 Hz or more. A liquid crystal material contained in the liquid crystal layer has negative dielectric anisotropy. Product Δnd of a gap d between the first substrate and the second substrate and refractive anisotropy Δn of the liquid crystal material is less than 0.33 μm. The gap d is more than 2 μm and less than 3 μm.

18 Claims, 7 Drawing Sheets

(56) References Cited

U.S. PATENT DOCUMENTS

| | | | |
|---|---|---|---|
| 2002/0180905 A1* | 12/2002 | Hong | G02F 1/1395 |
| | | | 349/96 |
| 2002/0185965 A1* | 12/2002 | Collins, III | H01L 33/505 |
| | | | 313/501 |
| 2005/0094078 A1* | 5/2005 | Kang | G02F 1/134363 |
| | | | 349/141 |
| 2006/0114395 A1* | 6/2006 | Kwon | G02F 1/1395 |
| | | | 349/139 |
| 2007/0008480 A1 | 1/2007 | Hong et al. | |
| 2007/0076161 A1* | 4/2007 | Morii | G02F 1/13392 |
| | | | 349/155 |
| 2007/0115417 A1* | 5/2007 | Ge | G02F 1/134363 |
| | | | 349/141 |
| 2009/0316098 A1 | 12/2009 | Ishihara et al. | |
| 2010/0165223 A1* | 7/2010 | Cho | C09K 19/3001 |
| | | | 349/33 |
| 2010/0225841 A1* | 9/2010 | Park | C09K 19/30 |
| | | | 349/48 |
| 2016/0189429 A1* | 6/2016 | Mallinson | G02B 26/10 |
| | | | 345/633 |
| 2017/0033792 A1* | 2/2017 | Takahashi | H01L 27/1225 |

* cited by examiner

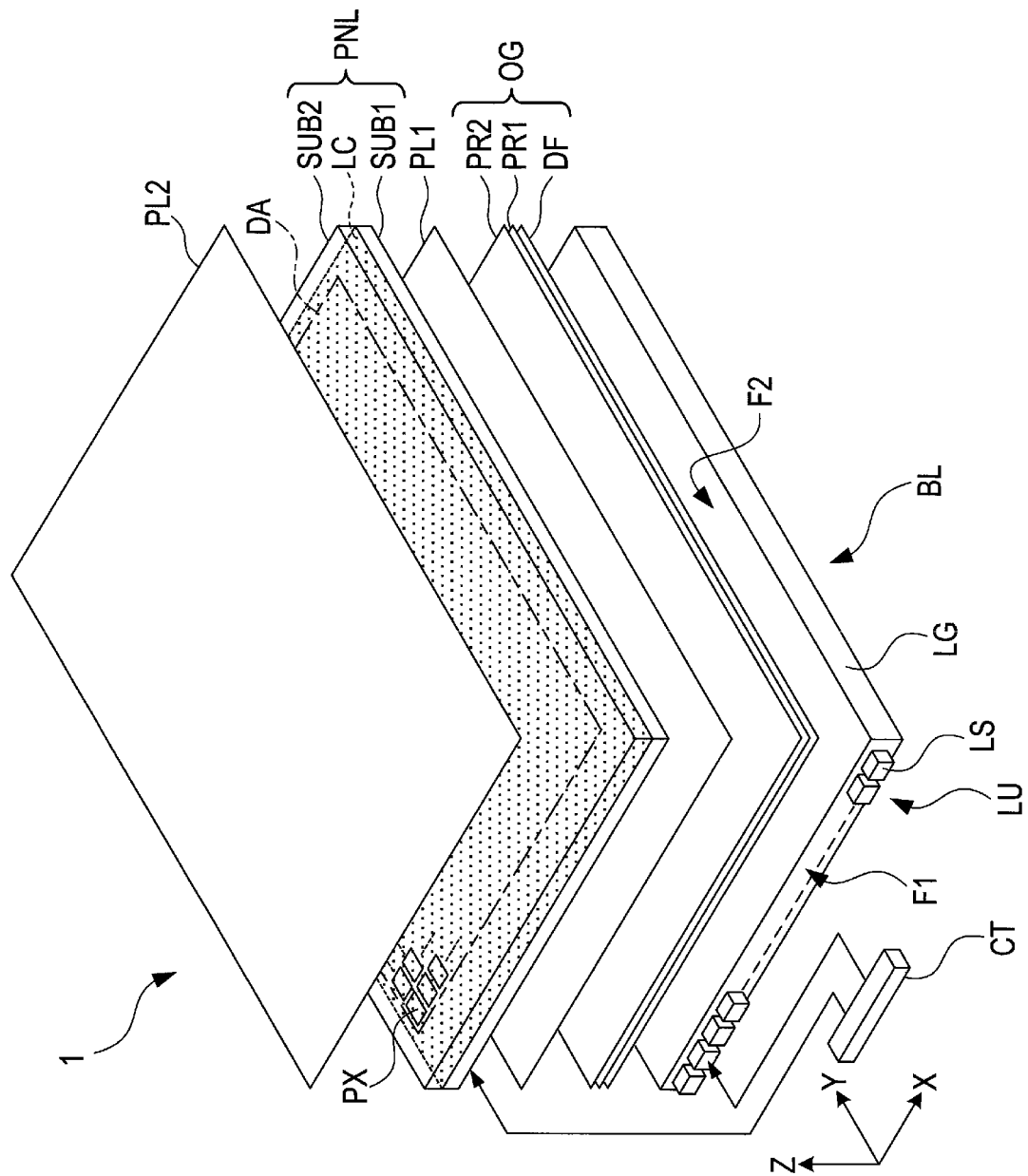
F I G. 1

|  | Referential example | Example 1 | Example 2 | Example 3 | Example 4 |
|---|---|---|---|---|---|
| Liquid crystal material | LM1 | LM2 | LM2 | LM2 | LM2 |
| Δn | 0.11 | 0.13 | 0.13 | 0.13 | 0.13 |
| d | 3.0 μm | 2.4 μm | 2.4 μm | 2.2 μm | 2.2 μm |
| Dbm | 6.2 μm | 6.2 μm | 5.3 μm | 6.2 μm | 5.0 μm |
| Transmittance ratio | 1.00 | 0.95 | 1.01 | 0.86 | 0.91 |
| Contrast | 1500 | 1300 | 1400 | 1200 | 1250 |
| High speed response | △ | ○ | ○ | ◎ | ◎ |

F I G. 10

DISPLAY DEVICE AND HEAD-MOUNTED DISPLAY

CROSS-REFERENCE TO RELATED APPLICATIONS

This application is based upon and claims the benefit of priority from Japanese Patent Application No. 2017-172350, filed Sep. 7, 2017, the entire contents of which are incorporated herein by reference.

FIELD

Embodiments described herein relate generally to a display device and a head-mounted display.

BACKGROUND

A liquid crystal display device in in-plane switching (IPS) mode is known as an example of a display device. The liquid crystal display device in IPS mode comprises a pixel electrode and a common electrode on either of a pair of substrates opposed via a liquid crystal layer, and the alignment of the liquid crystal molecules of the liquid crystal layer is controlled by using the lateral electric field generated between the electrodes. In addition, a liquid crystal display device in a fringe field switching (FFS) mode, which is one of the IPS modes, has been put into practical use. In the liquid crystal display device in the FFS mode, the pixel electrode and the common electrode are disposed in different layers of either of the substrates. The liquid crystal display device controls alignment of the liquid crystal molecules by using a fringing field generated between a pair of electrodes.

It is known that if a liquid crystal material having a negative dielectric anisotropy is used in the liquid crystal display device in the FFS mode, the transmittance is improved as compared with a liquid crystal material having a positive dielectric anisotropy.

BRIEF DESCRIPTION OF THE DRAWINGS

FIG. 1 is an exploded perspective view schematically showing a configuration example of a liquid crystal display device according to one of embodiments.

FIG. 10 is a table showing examples and a referential example.

DETAILED DESCRIPTION

Figure 2:
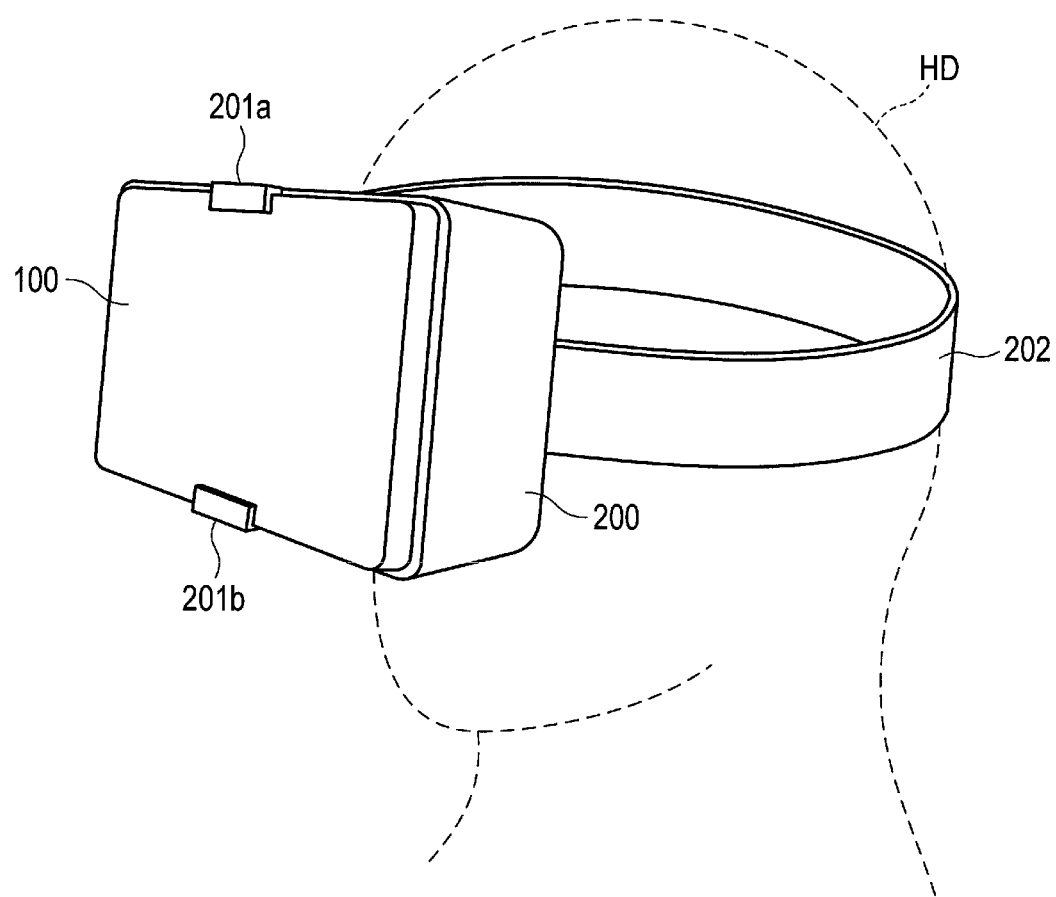
FIG. 2 is a perspective view schematically showing an example of use of the liquid crystal display device.

In general, according to one embodiment, a display device comprises first and second substrates and a liquid crystal layer. The first substrate includes a pixel electrode and a common electrode. The second substrate is opposed to the first substrate. The liquid crystal layer is between the first substrate and the second substrate. A frame frequency for rewriting a voltage of the pixel electrode is 80 Hz or more. A liquid crystal material contained in the liquid crystal layer has negative dielectric anisotropy. Product $\Delta$nd of a gap d between the first substrate and the second substrate and refractive anisotropy $\Delta$n of the liquid crystal material is less than 0.33 μm. The gap d is more than 2 μm and less than 3 μm.

Further, according to one embodiment, a head-mounted display comprises a display device and a head kit for attaching the display device to a user's head. The head kit comprises an attachment portion configured to attach the display device to the head kit, and a fixing portion configured to fix the head kit to the user's head. The display device comprises first and second substrates and a liquid crystal layer. The first substrate includes a pixel electrode and a common electrode. The second substrate is opposed to the first substrate. The liquid crystal layer is between the first substrate and the second substrate. A frame frequency of rewriting a voltage of the pixel electrode is 80 Hz or higher. A liquid crystal material contained in the liquid crystal layer has negative dielectric anisotropy. Product $\Delta$nd of a gap d between the first substrate and the second substrate and refractive anisotropy $\Delta$n of the liquid crystal material is less than 0.33 μm. The gap d is more than 2 μm and less than 3 μm.

Embodiments will be described hereinafter with reference to the accompanying drawings. The disclosure is merely an example, and proper changes within the spirit of the invention, which are easily conceivable by a skilled person, are included in the scope of the present invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the present specification, expressions such as "α includes A, B, or C", "α includes any one of A, B, and C" and "α includes an element selected from a group consisting of A, B, and C" do not exclude a case where α includes combinations of A, B, and C unless otherwise specified. Furthermore, these expressions do not exclude a case where α includes other elements.

In the expression "first α, second α, and third α" of the present specification, "first, second, and third" are convenient numbers used to explain the elements. In other words, an expression "A comprises third α" may indicate a case that A does not comprise first α and second α other than third α, unless otherwise specified.

In the present embodiment, a transmissive liquid crystal display device comprising a backlight is disclosed as an example of the display device. However, each embodiment does not prevent application of individual technical ideas disclosed in the embodiment to other types of display devices. Other types of display devices are assumed to include, for example, a reflective type liquid crystal display device which displays an image using outside light, and a liquid crystal display device having both the transmissive function and the reflective function.

FIG. 1 is an exploded perspective view schematically showing a configuration example of a display device 1. The display device 1 comprises an illumination device BL and a display panel PNL. A first direction X, a second direction Y, and a third direction Z are defined as shown in the drawing. The directions X, Y, and Z are orthogonal to each other but may intersect at an angle other than a right angle. In the present disclosure, a direction indicated by an arrow of the third direction Z is referred to as "above" or "on", and an opposite direction of the arrow is referred to as "below" or "under".

In the example shown in FIG. 1, an illumination device BL is a side-edge type backlight comprising a light guide LG opposed to the display panel PNL and a light source unit LU. However, the configuration of the illumination device BL is not limited to the example shown in FIG. 1, but the illumination device BL may be the other type of device which is configured to supply light necessary for image display. For example, the illumination device BL may be what is called a direct type backlight including a light source disposed below the display panel PNL.

In the example shown in FIG. 1, each of the display panel PNL and the light guide LG is formed in a rectangular shape having shorter sides in the first direction X and longer sides in the second direction Y. The shape of the display panel PNL and the light guide LG is not limited to a rectangle, but may be the other shape.

The light source unit LU comprises light sources LS arranged in the first direction X along an incident surface F1 (side surface) of the light guide LG. The light sources LS are, for example, light-emitting diodes but may be the other type of light-emitting elements such as organic electroluminescent devices. Light from the light sources LS is made incident on the light guide LG from the incidence surface F1 and emitted from an emission surface F2 opposed to the display panel PNL.

The display panel PNL is a transmissive liquid crystal panel, and comprises a first substrate SUB1, a second substrate SUB2 opposed to the first substrate SUB1, and a liquid crystal layer LC sealed between the first substrate SUB1 and the second substrate SUB2. The display panel PNL includes a display area DA including pixels PX. The pixels PX are arrayed in a matrix in the first direction X and the second direction Y.

The display device 1 further comprises an optical sheet group OG, a first polarizer PL1, a second polarizer PL2, and a controller CT. The optical sheet group OG includes, for example, a diffusion sheet DF which diffuses the light emitted from the emission surface F2, and a first prism sheet PR1 and a second prism sheet PR2 in which a number of prism lenses are formed. The first polarizer PL1 is disposed on the optical sheet group OG and the first substrate SUB1. The second polarizer PL2 is disposed above the second substrate SUB2.

The controller CT controls the display panel PNL and the light source unit LU. For example, the controller CT can be composed of the IC and various types of circuit devices. The controller CT may be composed of the IC which controls the display panel PNL and the IC which controls the light source unit LU. In this case, the ICs may be disposed at positions remote from each other.

The display device 1 can be used for, for example, various devices such as a smartphone, a tablet terminal, a mobile phone terminal, a personal computer, a TV receiver, a vehicle-mounted device, a game console, and a head-mounted device.

If the display device 1 is applied to a smartphone, the display device 1 can be used as a display for Virtual Reality (VR), Augmented Reality (AR) or Mixed Reality (MR). FIG. 2 is a perspective view schematically showing an example of the usage. The illustrated head-mounted display comprises the display device 1 and a head kit 200. A smartphone 100 is attached to the head kit 200 by a pair of lugs 201a and 201b (attachment portions). The head kit 200 is mounted on a user's head HD by a band 202 (fixing portion). In this example, the smartphone 100 can be used as a display unit of the head-mounted display. The attachment portions may be designed in any shape if they are capable of fixing the display device 100 to the head kit 200. For example, the attachment portions may be designed in a casing and fixed by magnets, an adhesive or the like. In addition, the fixing portion may be designed in any shape if fixing portion fixes the head kit 200 to the user's head HD. For example, the fixing portion may be designed in a shape to be hooked on ears of the head HD such as a frame of glasses. In addition, the display device 1 may not be a smartphone but the other terminal such as a tablet terminal or a mobile phone terminal.

Figure 3:
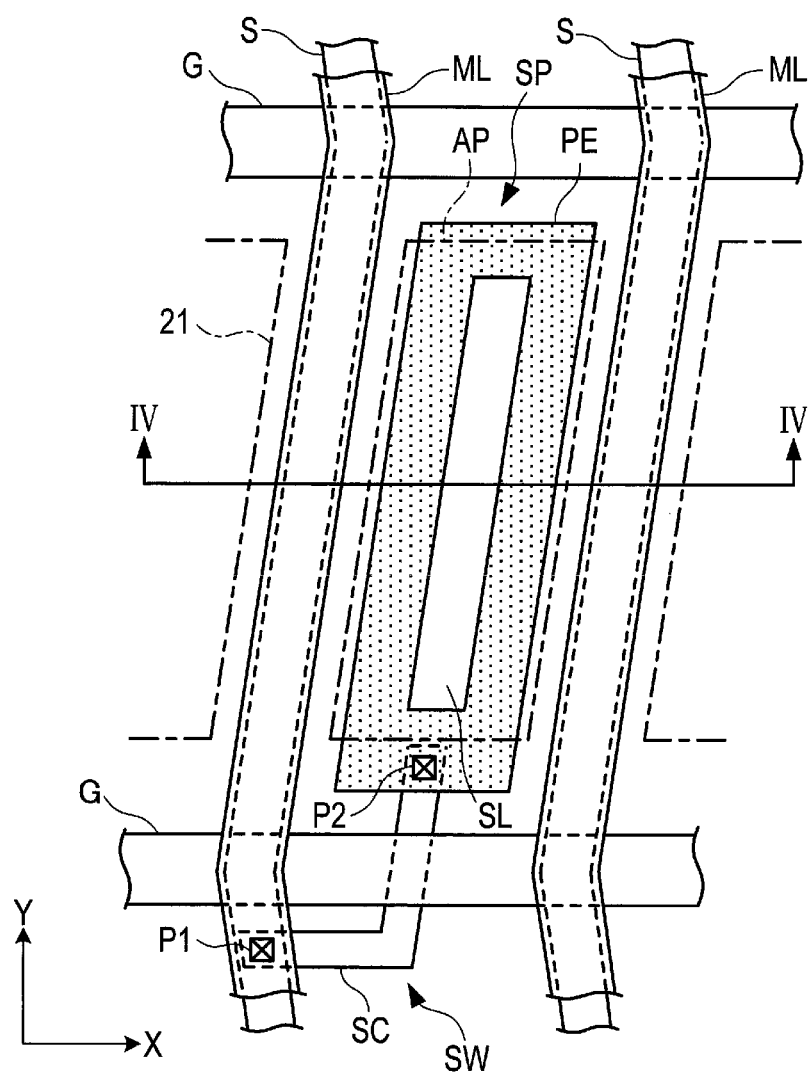
FIG. 3 is a plan view showing a configuration example of a sub-pixel provided in the liquid crystal display device.

The pixel PX shown in FIG. 1 includes sub-pixels corresponding to different colors. FIG. 3 is a plan view showing a configuration example of a sub-pixel SP.

The display panel PNL comprises scanning lines G, signal lines S which intersect the scanning lines G, metal lines ML, and a light-shielding layer 21. The scanning lines G extend in the first direction X and are arranged in the second direction Y. The signal lines S extend in the second direction Y and are arranged in the first direction X. In the example shown in FIG. 3, the signal lines S are bent but may be shaped in a straight line.

An area surrounded by two adjacent scanning lines G and two adjacent signal lines S corresponds to the sub-pixel SP. The sub-pixel SP comprises a pixel electrode PE. In the example of FIG. 3, the pixel electrode PE comprises a slit SL. The pixel electrode PE may comprise plural slits SL or may not comprise the slits SL.

A switching element SW is provided for each of the sub-pixels SP. The switching element SW comprises a semiconductor layer SC. The semiconductor layer SC is connected to the signal line S at a first position P1 and connected to the pixel electrode PE at a second position P2.

Each of the metal lines ML overlaps the corresponding signal line S in planar view. The width of the metal line ML is larger than the width of the signal line S. The light-shielding layer 21 is opposed to the scanning lines G, the signal lines S, the metal lines ML, and the semiconductor layer SC. The light-shielding layer 21 includes an aperture AP in the sub-pixel SP. The pixel electrode PE is disposed at the aperture AP.

Figure 4:
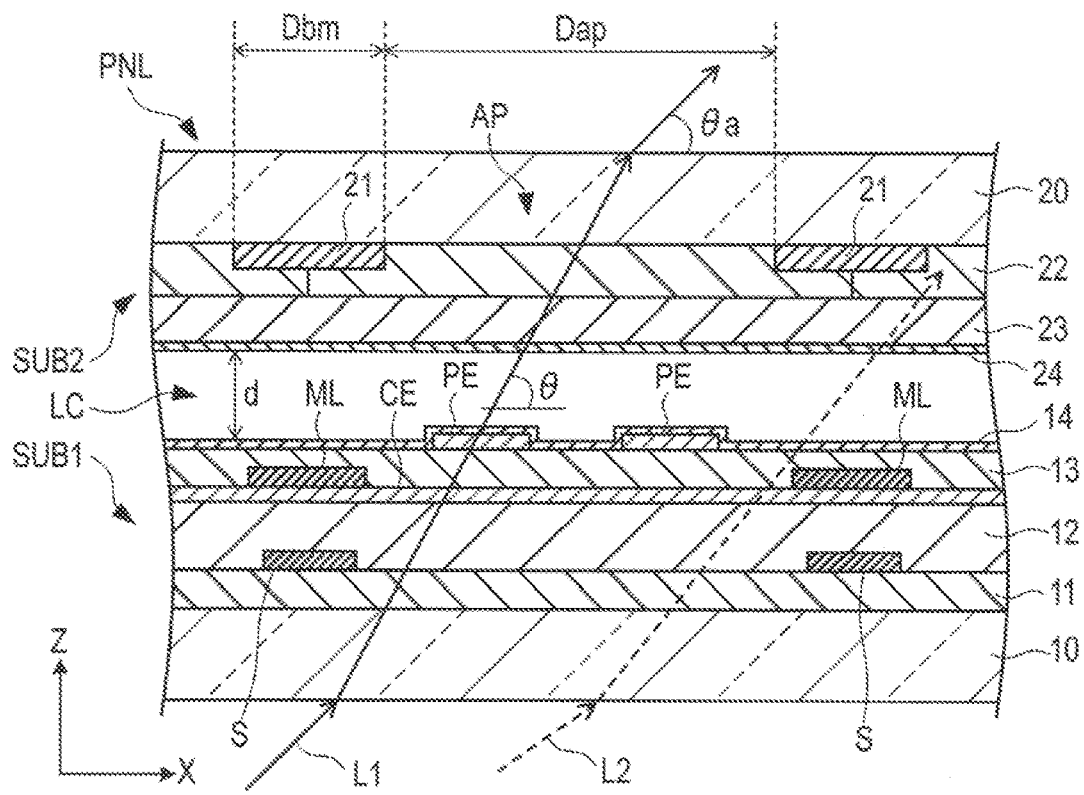
FIG. 4 is a cross-sectional view schematically showing the display panel seen along line IV-IV of FIG. 3.

FIG. 4 is a schematic cross-sectional view showing the display panel PNL seen along line IV-IV in FIG. 3. The first substrate SUB1 comprises a first base 10 which is, for example, a glass substrate or a resin substrate, a first insulating layer 11, a second insulating layer 12, a third insulating layer 13, and a first alignment film 14. The first insulating layer 11 covers the first insulating base 10. The signal line S is disposed on the first insulating layer 11. The second insulating layer 12 covers the signal line S and the first insulating layer 11. The common electrode CE is disposed on the second insulating layer 12. The metal line ML is disposed on the common electrode CE. The third insulating layer 13 covers the metal line ML and the common electrode CE. The pixel electrode PE is disposed on the third insulating layer 13. The first alignment film 14 covers the pixel electrode PE and the third insulating layer 13.

The second substrate SUB2 comprises a second base 20 which is, for example, a glass substrate or a resin substrate, a color filter layer 22, an overcoat layer 23, and a second alignment film 24. The light-shielding layer 21 is disposed under the second base 20. The color filter 22 covers the second base 20 and the light-shielding layer 21. A boundary between the color filter layers 22 adjacent to each other overlaps the light-shielding layer 21. The overcoat layer 23 covers the color filter 22. The second alignment film 24 covers the overcoat layer 23.

A gap d is formed between the first alignment film 14 and the second alignment film 24. The liquid crystal layer LC is disposed between the alignment films 14 and 24. The liquid crystal layer LC is composed of a liquid crystal material (liquid crystal mixture) a predetermined dielectric anisotropy $\Delta\varepsilon$ and a predetermined refractive anisotropy $\Delta n$.

The sectional structure of the display panel PNL is not limited to the example shown in FIG. 4. For example, the pixel electrode PE and the common electrode CE may be disposed in the same layer. In addition, the common electrode CE may be disposed between the liquid crystal layer LC and the pixel electrode PE. In this case, a slit may be provided in the common electrode CE, in each of the sub-pixels SP. In addition, the metal lines ML may be disposed between the second insulating layer 12 and the common electrode CE or at the other positions. The color filter 22 may be disposed on the first substrate SUB1.

As explained above, the display device 1 has an IPS-mode structure in which the pixel electrode PE and the common electrode CE are disposed in the first substrate SUB1. As shown in FIG. 4, the structure in which the pixel electrode PE and the common electrode CE are disposed in different layers of the first substrate SUB1 corresponds to the FFS mode, which is one of types of the IPS mode. In the mode of this type, if the liquid crystal layer LC is composed of a liquid crystal material having a negative dielectric anisotropy $\Delta\varepsilon$, with definition of, for example, approximately 800 ppi, the transmittance of the display panel PNL can be increased as compared with a liquid crystal material having a positive dielectric anisotropy $\Delta\varepsilon$.

In the display device for mobile devices such as smartphones, luminance is desirably secured with the negative liquid crystal material for necessity to reduce the power consumption of the backlight. In contrast, if the smartphone is used as the display for AR, VR, or MR as shown in FIG. 2, the improvement of the response speed is required. That is, a sufficient response speed needs to be secured while using a negative liquid crystal material having large rotary viscosity coefficient $\gamma 1$. Furthermore, moving image blur needs to be suppressed and the display quality needs to be enhanced for use in AR, VR, or MR.

A structure for enhancing the response speed, suppressing the moving image blur, and securing the sufficient luminance when using the negative liquid crystal material will be explained. The response speed can be defined as, for example, response time $\tau$on for the light transmittance in an initial state to reach a predetermined level when an electric field is applied to the liquid crystal layer LC, and response time $\tau$off for the transmittance in the predetermine level to lower to the initial state when application of the electric field to the liquid crystal layer LC is stopped.

[Improvement 1 of Response Speed]

The transmittance of the display panel PNL is proportional to $\Delta$nd. Furthermore, $\Delta$nd also gives an influence to hue of the display panel PNL. To give priority to the transmittance and set the hue of the display panel PNL to be a desirable state, the optimum value of $\Delta$nd is often 0.34 µm. $\Delta$n in the embodiments is the refractive anisotropy of the light having a wavelength of 589 nm under a temperature condition of 25° C.

In contrast, the response speed can be made higher if the gap d is smaller. In addition, the rotary viscosity coefficient $\gamma 1$ is proportional to $\Delta$n. Therefore, if the liquid crystal material having small $\Delta$n is used, the response speed can be made higher since $\gamma 1$ of this liquid crystal material is also smaller.

In the embodiments, the response speed is improved by making at least one of $\Delta$n and gap d smaller. More specifically, $\Delta$n and gap d are selected to satisfy [expression 1] mentioned below, excluding the condition that the optimum value of $\Delta$nd is 0.34 µm from the viewpoint of the transmittance.

$$\Delta nd<0.33 \text{ µm} \qquad \text{[expression 1]}$$

The display panel PNL is more desirable if satisfying $\Delta$nd<0.32 µm.

However, if $\Delta$nd is too small the transmittance and the hue of the display panel PNL do not become practical. Thus, the display panel PNL desirably satisfies 0.24 µm<$\Delta$nd. The display panel PNL is more desirable if satisfying 0.28 µm<$\Delta$nd, and still more desirable if satisfying 0.30 µm<$\Delta$nd.

[Improvement 2 of Response Speed]

Figure 5:
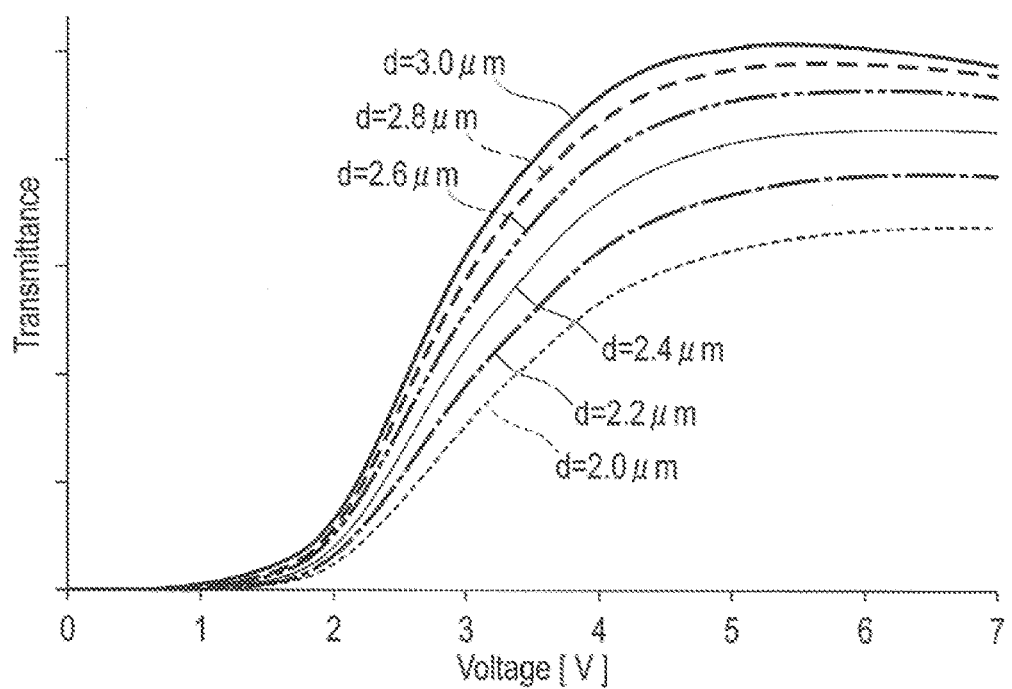
FIG. 5 is a graph showing a relationship between a drive voltage and transmittance in the display panel.

FIG. 5 is a graph showing a relationship between drive voltage [V] and the transmittance of the display panel PNL with respect to gaps d. The drive voltage is a voltage applied between the pixel electrode PE and the common electrode CE. As evident from this graph, the transmittance is higher as the gap d is larger.

If the gap d is set to be 3.0 µm or more the transmittance can be made extremely higher. In this case, however, the response speed cannot be made sufficiently high. In contrast, if the gap d is set to be 2.0 µm or less, a desirable response speed can be obtained but the transmittance becomes too small. Thus, the gap d is desirably determined in a range which satisfies [expression 2] mentioned below.

$$2.0 \text{ µm}<d<3.0 \text{ µm} \qquad \text{[expression 2]}$$

The degree of improvement of the response speed becomes larger by lowering the gap d rather than lowering $\Delta$n. For this reason, an extremely small, practical gap d may be selected in a range which satisfies 2.0 µm<d<3.0 µm and [expression 1] mentioned above may be satisfied in accordance with the selected gap d. However, since $\gamma 1$ is larger as $\Delta$n becomes larger, $\Delta$n is desirably selected in a range of 0.12<$\Delta$n<0.14, practically.

[Improvement 3 of Response Speed]

The liquid crystal material has elastic constant K11 for divergent deformation, elastic constant K22 for torsional deformation, and elastic constant K33 for bending deformation. The above-mentioned response time $\tau$off is proportional to $\gamma 1/(\Delta n^2 * K22)$.

K22 is more difficult to measure than K11 and K33. In addition, it is known that K11 and K22 correlate with each other. Therefore, $\tau$off is considered to be proportional to $\gamma 1/(\Delta n^2 * K11)$. $\tau$off can be reduced by reducing $\gamma 1/(\Delta n^2 * K11)$. More specifically, a liquid crystal material in which $\gamma 1$, $\Delta n$, and K11 satisfy [expression 3] mentioned below is desirably selected.

$$\gamma 1/(\Delta n^2 * K11)<650 \qquad \text{[expression 3]}$$

The response speed can be further improved by using such a liquid crystal material. For example, a liquid crystal material having K11 of approximately 1.4×10^(−10) [N] and γ1 of approximately 110 mPa·s can be used.

[Retention of Luminance]

As shown in FIG. 4, width Dap of the aperture AP becomes larger as width Dbm of the light-shielding layer 21 which overlaps the signal line S and the metal line ML is smaller. Therefore, if the width Dbm is smaller, the aperture ratio of the sub-pixel SP is improved and the luminance is enhanced. However, if the width Dbm is smaller, color mixture may occur in adjacent sub-pixels SP when the display panel PNL is seen from an oblique direction.

That is, in general, light passing through the liquid crystal layer LC corresponding to a certain sub-pixel SP passes through the color filter 22 of this sub-pixel SP, similarly to light L1 shown in FIG. 4. In contrast, if light passing through the liquid crystal layer LC corresponding to a certain sub-pixel SP passes through a color filter 22 of a sub-pixel SP adjacent to this sub-pixel SP, similarly to light L2 shown in FIG. 4, a color different from the original may be visually recognized by the user.

In the embodiments, the width Dbm is defined so as to prevent the color mixture from occurring when the display panel PNL is seen from an oblique direction of 45 degrees, i.e., when angle θa of the light L1 in FIG. 4 is 45 degrees. Since the light is refracted in the incidence on and emission from the display panel PNL, angle θ of the light in the display panel PNL is approximately 62 degrees by the Snell's law if the angle θa is 45 degrees.

Figure 6:
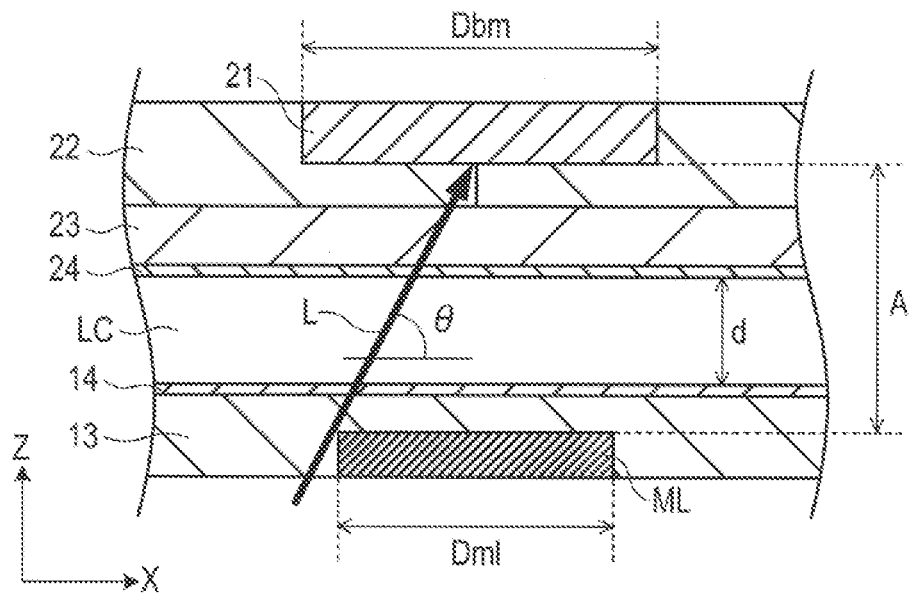
FIG. 6 is a cross-sectional view schematically showing a part of the display panel.
Figure 7:
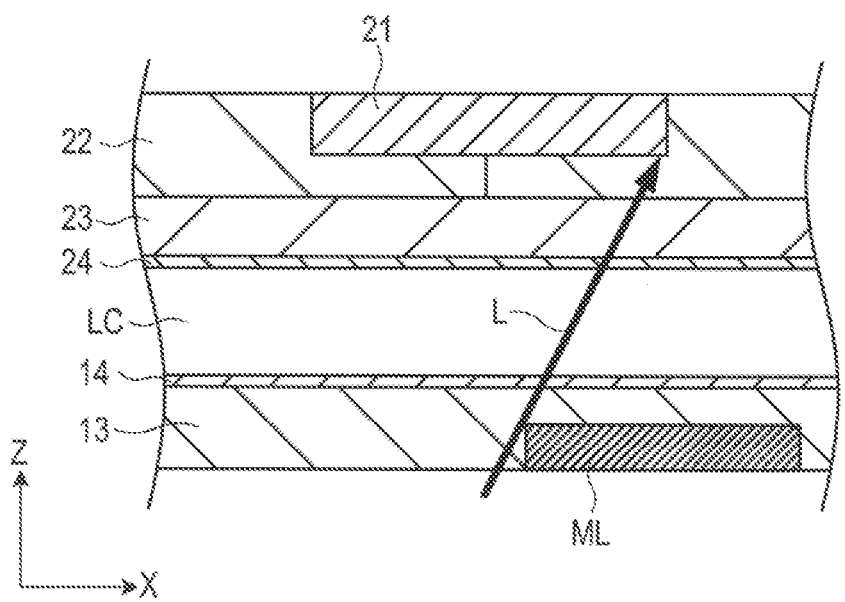
FIG. 7 is a cross-sectional view schematically showing a part of the display panel.

FIG. 6 and FIG. 7 are schematically cross-sectional views showing parts of the display panel PNL. Illustration of the bases 10, 20, and the like is omitted in these figures. As shown in FIG. 6, the width Dbm of the light-shielding layer 21 is larger than width Dml of the metal line ML. A distance between the light-shielding layer 21 and the metal line ML is A. The distance A includes the thicknesses of the third insulating layer 13, the color filter layer 22, the overcoat layer 23, and the alignment films 14 and 24, and the gap d.

In FIG. 6, a center of the light-shielding layer 21 in the first direction X and a center of the metal layer ML in the first direction X are aligned in the third direction Z. To desirably shield the metal line ML from the light, the width Dbm is desirably larger than the width Dml by approximately 1.5 μm. If it is assumed that the light L inclined at the angle θ of 62 degrees passes through a close vicinity to the end portion of the metal line ML and abuts on a close vicinity to the center of the light-shielding layer 21, the width Dbm can be represented as Dbm=(A/tan θ)+1.5=2(A/1.88)+1.5. Furthermore, the width Dbm is desirably defined to satisfy [expression 4] mentioned below in consideration of the elements of the display panel PNL and the variation in angle θ, and the like.

$$0.9(2(A/1.88)+1.5) < Dbm < 1.1(2(A/1.88)+1.5)$$ [expression 4]

If [expression 4] is satisfied the mixture of colors of the adjacent sub-pixels SP can be suppressed. Furthermore, it can be understood that since the distance A is smaller as the gap d becomes smaller, the width Dbm can be consequently made smaller. That is, if the gap d is made smaller to increase the response speed as explained above, the aperture ratio of the sub-pixel SP can be increased and the luminance of the display panel PNL can be enhanced by making the width Dbm smaller. Thus, even when Δnd is defined as [expression 1] and the transmittance is lowered, making the width Dbm smaller can compensate for the reduction in luminance.

If misalignment between the first substrate SUB1 and the second substrate SUB2 occurs, the center of the light-shielding layer 21 and the center of the metal line ML may be misaligned as shown in, for example, FIG. 7. If the width Dbm is defined within a range of [expression 4], the color mixture can be desirably prevented even when the misalignment occurs.

[Improvement of Moving Image Display Quality]

When the display device 1 is used for VR, AR, or MR, the moving image becomes clearer and immersion can be further obtained as the frame frequency to rewrite the voltage of the pixel electrode PE is higher. Thus, the display device 1 desirably has a frame frequency of 80 Hz or higher.

In contrast, the power consumption is increased as the frame frequency is made higher. For this reason, the battery power can easily be consumed in the mobile device such as the smartphone 100 shown in FIG. 2. Thus, the display device 1 according to the embodiments comprises a first mode (normal mode) of rewriting the voltage of the pixel electrode PE with a first frame frequency f1, and a second mode (VR/AR/MR mode) of rewriting the voltage of the pixel electrode PE with a second frame frequency f2 larger than the first frame frequency f1.

Change between the first mode and the second mode can be executed by the above-explained controller CT. For example, the controller CT changes the first mode and the second mode, in response to a mode change signal input from a processor which controls the smartphone 100. Mode change can be executed in two stages of the first mode and the second mode, but in more stages.

For example, the first frame frequency f1 is 60 Hz, which is applied to a display for a general mobile device. The first frame frequency f1 may be the other value of 60 Hz or lower. In addition, for example, the second frame frequency f2 is in a range of 60 Hz<f2<140 Hz. More desirably, the second frame frequency f2 is in a range of 80 Hz≤f2≤110 Hz.

Figure 8:
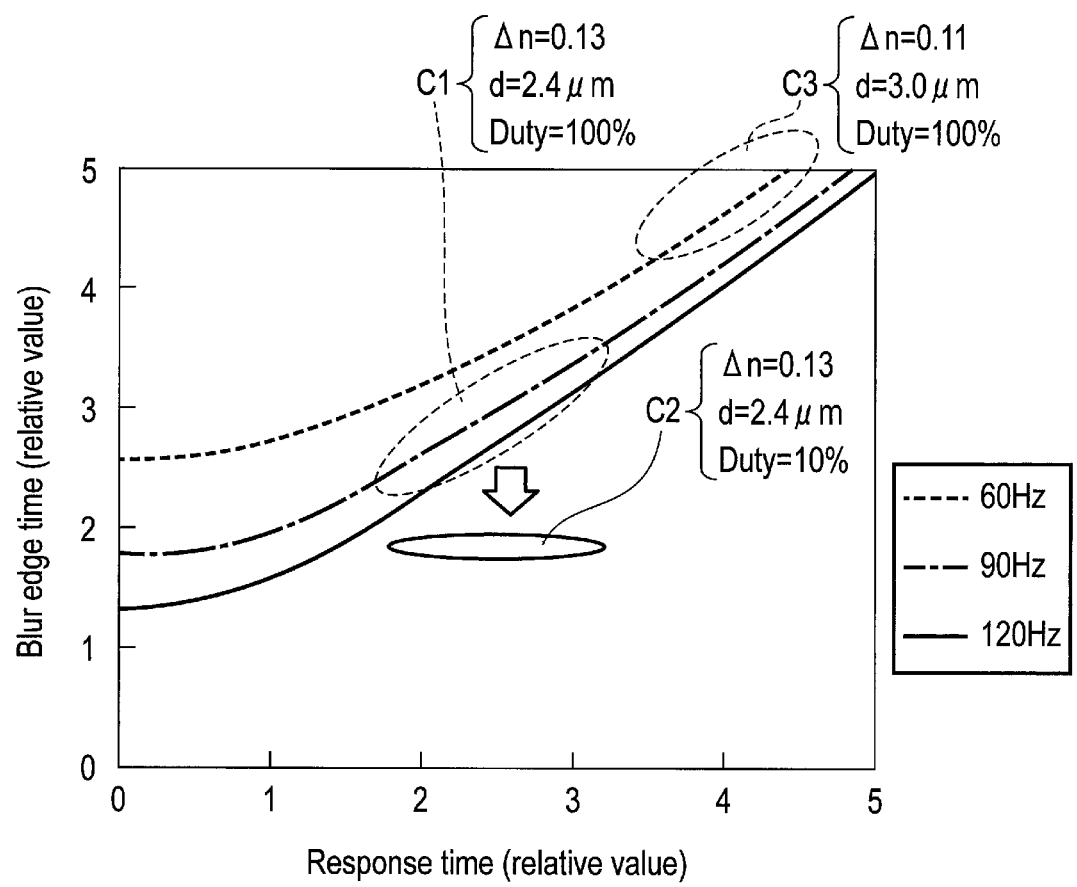
FIG. 8 is a graph showing a relationship between a response time and a blur edge time on the display panel.

FIG. 8 is a graph showing a relationship between a response time and a blur edge time (BET) on the display panel PNL, with respect to frame frequencies. Each of the response time on the horizontal axis and the blur edge time on the vertical axis is a relative value. As understood from curves of the frame frequencies of 60 Hz, 90 Hz, and 120 Hz, the blur edge time is improved as the frame frequency is higher.

In addition, the blur edge time can be further improved by urging an illumination device BL to blink at the moving picture display. At the blinking, for example, the controller CT controls each light source LS such that the illumination period of the illumination device BL becomes a predetermined duty ratio. An area C1 in FIG. 8 represents the blur edge time in a case of turning on the illumination device BL at any time (Duty=100%) in the display device 1 having Δn=0.13 and d=2.4 μm. An area C2 represents the blur edge time in a case of urging the illumination device BL to blink at the duty ratio of 10% in the display device 1 having Δn=0.13 and d=2.4 μm. As evident from comparison between the areas C1 and C2, the blur edge time can be improved by executing the blinking. The blur edge time can be improved when the duty ratio is not only 10%, but the other value.

Δn and the distance d of the display device 1 in the areas C1 and C2 satisfy the above-mentioned [expression 1] and [expression 2]. An area C3 in FIG. 8 represents the blur edge time in a case of turning on the illumination device in the display device having Δn=0.11 and d=3.0 μm. Δn and the distance d do not satisfy the above-mentioned [expression 1] and [expression 2]. It can be understood from the comparison between the areas C1 and C3 that the blur edge time is improved if [expression 1] and [expression 2] are satisfied.

In general, a light-emitting diode which emits white light is used as a light source of the display device for the mobile device. In recent years, particularly, a phosphorconverting light-emitting diode (phosphorconverting-white LED) comprising a light-emitting element which emits blue light, a G phosphor which emits green light, and an R phosphor which emits red light has been used to extend color gamut. However, the response speed to the current, in the phosphor, is different in a compound structure. In other words, the light source using phosphors of plural colors are not suitable for the light source which blinks at a high speed. In particular, since the R phosphor used in this type of light-emitting diode generally has a poor response property, afterglow of red light may occur when the blinking is executed. Furthermore, if $\Delta$nd is small so as to satisfy [expression 1] mentioned above, wavelengths of the red light and the green light included in the white light from the illumination device BL are shifted and the display image is tinged with blue.

Figure 9:
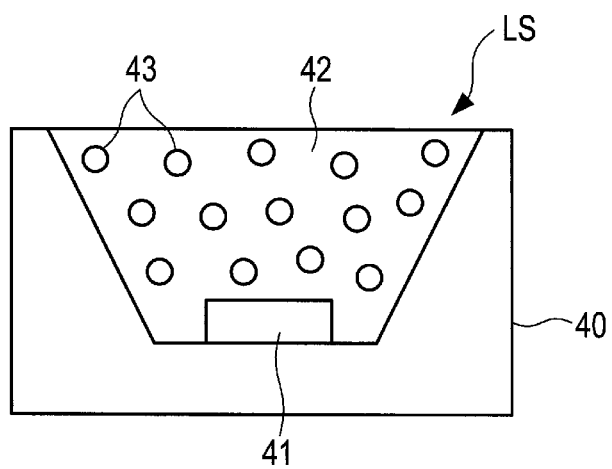
FIG. 9 is a cross-sectional view schematically showing a configuration example of a light source.

As a measure against these, in the embodiments, what is called YAG-LED is used as the light source LS shown in FIG. 1. Since YAG-LED uses only one blue light emitting diode, the response speed depending on the compound structure of the phosphor is not differentiated. FIG. 9 is a cross-sectional view schematically showing a configuration example of a light source LS which is YAG-LED. The light source LS comprises a cup 40. A light-emitting element 41 which emits blue light is disposed on a bottom surface of the cup 40. A resin member 42 including Y phosphors 43 is disposed inside the cup 40. The Y phosphors 43 are excited by receiving light of the light-emitting element 41 and emits yellow light. Blue light emitted from the light-emitting element 41 and yellow light emitted from the Y phosphors 43 are mixed to generate white light.

Since the white light can be generated without using the red light, in the light source LS, afterglow of red light does not occurs even if blinking is executed. In addition, the light passing through a layer of a liquid crystal material in which the above-mentioned product $\Delta$nd of the refractive anisotropy $\Delta$n and the gap d is less than 0.33 μm tends to be tinged with blue. Therefore, since yellow light is used for the generation of white light, the phenomenon that the display image is tinged with blue can easily be corrected.

In addition, if white light is generated with light-emitting elements of different colors, wide space to arrange these light-emitting elements is required in the frame area. In contrast, the light source LS shown in FIG. 9 is small since the light source LS comprises only one light-emitting element 41 emitting blue light, and enables the frame area to be narrowed.

EXAMPLES

FIG. 10 is a table showing examples on the refractive anisotropy $\Delta$n and the gap d of the liquid crystal material and the width Dbm of the light-shielding layer 21.

In a display device of a referential example, liquid crystal material LM1 having $\Delta$n=0.11 was used. Furthermore, the gap d was 3.0 μm and the width Dbm was 6.2 μm. That is, $\Delta$nd of the display device of the referential example was 0.33 μm, which is close to the optimum value of 0.34 μm from the viewpoint of the transmittance, and which is excluded from the range of the above-mentioned [expression 1]. In addition, the gap d is excluded from the range of the above-mentioned [expression 2]. The transmittance was 1.00 under this condition. Contrast was 1500, which was the difference between the luminance of the white display and the luminance of the black display. In addition, when a moving image was displayed by driving the liquid crystal material LM1 with the frame frequency of 90 Hz, blur was slightly seen in the moving image (Δ in FIG. 10).

The table shows $\Delta$n, the gap d, and the width Dbm of the display devices of examples 1 to 4. $\Delta$n and the gap d of the display devices of examples 1 to 4 were the values within the ranges of [expression 1] and [expression 2]. Furthermore, liquid crystal material LM2 satisfied the above-mentioned [expression 3] and the width Dbm satisfied the above-mentioned [expression 4]. Since the display devices of examples 1 to 4 satisfied [expression 1] to [expression 3], the response speed was improved as compared with the display device of the referential example. More specifically, when the image was displayed by driving the liquid crystal material of 90 Hz, blur was hardly seen in the moving image in examples 1 and 2 (○ in FIG. 10) and no blur was seen in the moving image in examples 3 and 4 (◉ in FIG. 10).

The width Dbm in the display device of example 1 was the same as that in the referential example. Therefore, the transmittance ratio and the contrast were smaller than those in the referential example as $\Delta$nd was smaller than that in the referential example, but the difference was extremely small. In contrast, since the display device of example 2 was the same as the display device of example 1 with respect to $\Delta$nd but was smaller in width Dbm than the display device of example 1, the display device of example 2 could obtain substantially the same transmittance ratio and contrast as those in the referential example. Since $\Delta$nd in the display devices of examples 3 and 4 was smaller than that in examples 1 and 2, the transmittance ratio and contrast were smaller than those in examples 1 and 2 but were sufficient values as the products.

It can be understood from examples 1 to 4 and the referential example that the luminance and the contrast can be kept at desirable values while making the response speed higher by adjusting $\Delta$n, the gap d, and the width Dbm. In addition, it can be understood that examples 1 to 4 can respond to the moving image display of high-speed response.

Furthermore, the moving image display quality can be improved if the first mode and the second mode different in frame frequency are changeable as explained above, blinking of the illumination device BL is executed, and YAG-LED is adopted as the light source LS.

All of the conditions such as the other numerical ranges disclosed in [expression 1] to [expression 4] and the embodiments do not need to be satisfied simultaneously. Even if at least one of the conditions is satisfied, desirable advantages resulting from the satisfied condition can be obtained.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions, or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a first substrate including a pixel electrode and a common electrode;
a second substrate opposed to the first substrate; and
a liquid crystal layer between the first substrate and the second substrate,
wherein
a frame frequency for rewriting a voltage of the pixel electrode is 80 Hz or more
a liquid crystal material contained in the liquid crystal layer has negative dielectric anisotropy,
product $\Delta nd$ of a gap d between the first substrate and the second substrate and refractive anisotropy $\Delta n$ of the liquid crystal material is less than 0.33 μm, and
the gap d is more than 2 μm and less than 3 μm, and
wherein
the first substrate includes a signal line connected to the pixel electrode, and a metal line which is disposed between the signal line and the liquid crystal layer to overlap the signal line in planar view,
the second substrate includes a light-shielding layer which overlaps the metal line in planar view, and
width Dbm [μm] of the light-shielding layer and distance A [μm] between the metal line and the light-shielding layer satisfy an expression mentioned below $$0.9(2(A/1.88)+1.5) < Dbm < 1.1(2(A/1.88)+1.5).$$

2. The display device of claim 1, further comprising:
an illumination device configured to emit light to the first substrate,
wherein
the illumination device is configured to blink at a predetermined frequency when an image is displayed.

3. The display device of claim 1, further comprising:
an illumination device configured to emit light to the first substrate,
wherein
the illumination device comprises a light source which emits white light,
the light source includes a light-emitting element which emits blue light and a phosphor which is excited by the blue light to emit yellow light, and
the white light is generated by mixing the blue light and the yellow light.

4. The display device of claim 1, further comprising:
a first mode of rewriting a voltage of the pixel electrode with a first frame frequency; and
a second mode of rewriting the voltage of the pixel electrode with a second frame frequency larger than the first frame frequency,
wherein
$\Delta nd$ is more than 0.28 μm and less than 0.33 μm, and
the second frame frequency is 80 Hz or higher and 110 Hz or lower.

5. The display device of claim 4, wherein
the first frame frequency is 60 Hz or lower.

6. The display device of claim 1, wherein
$\Delta nd$ is 0.33 μm or more when transmittance of the liquid crystal layer is maximum.

7. The display device of claim 1, wherein
$\Delta nd$ is more than 0.30 μm and less than 0.32 μm.

8. The display device of claim 1, wherein
the refractive anisotropy $\Delta n$ is more than 0.12 and less than 0.14.

9. A display device, comprising:
a first substrate including a pixel electrode and a common electrode:,
a second substrate opposed to the first substrate; and
a liquid crystal layer between the first substrate and the second substrate,
wherein
a frame frequency for rewriting a voltage of the pixel electrode is 80 Hz or more
a liquid crystal material contained in the liquid crystal layer has negative dielectric anisotropy,
product $\Delta nd$ of a gap d between the first substrate and the second substrate and refractive anisotropy $\Delta n$ of the liquid crystal material is less than 0.33 μm, and
the gap d is more than 2 μm and less than 3 μm, and
wherein
rotary viscosity coefficient γ1 of the liquid crystal material, elastic constant K11 of divergent deformation, and $\Delta nd$ satisfy an expression mentioned below $$\gamma 1/(\Delta n^2 * K11) < 650.$$

10. A head-mounted display, comprising a display device and a head kit for attaching the display device to a user's head,
wherein
the head kit comprises:
an attachment portion configured to attach the display device to the head kit; and
a fixing portion configured to fix the head kit to the user's head,
the display device comprises:
a first substrate including a pixel electrode and a common electrode;
a second substrate opposed to the first substrate; and
a liquid crystal layer between the first substrate and the second substrate,
a frame frequency of rewriting a voltage of the pixel electrode is 80 Hz or higher,
a liquid crystal material contained in the liquid crystal layer has negative dielectric anisotropy,
product $\Delta nd$ of a gap d between the first substrate and the second substrate and refractive anisotropy $\Delta n$ of the liquid crystal material is less than 0.33 μm, and
the gap d is more than 2 μm and less than 3 μm, and
wherein
the first substrate includes a signal line connected to the pixel electrode, and a metal line which is disposed between the signal line and the liquid crystal layer to overlap the signal line in planar view, the second substrate includes a light-shielding layer which overlaps the metal line in planar view, and width Dbm [μm] of the light-shielding layer and distance A [μm] between the metal line and the light-shielding layer satisfy an expression mentioned below $$0.9(2(A/1.88)+1.5)<Dbm<1.1(2(A/1.88)+1.5).$$

11. The head-mounted display of claim 10, further comprising;
an illumination device configured to emit light to the first substrate,
wherein
the illumination device is configured to blink at a predetermined frequency when an image is displayed.

12. The head-mounted display of claim 10, further comprising:
an illumination device configured to emit light to the first substrate,
wherein
the illumination device comprises a light source which emits white light,
the light source includes a light-emitting element which emits blue light and a phosphor which is excited by the blue light to emit yellow light, and
the white light is generated by mixing the blue light and the yellow light.

13. The head-mounted display of claim 10, further comprising:
a first mode of rewriting a voltage of the pixel electrode with a first frame frequency; and
a second mode of rewriting the voltage of the pixel electrode with a second frame frequency larger than the first frame frequency,
wherein
Δnd is more than 0.28 μm and less than 0.33 μm, and
the second frame frequency is 80 Hz or more and 110 Hz or less.

14. The head-mounted display of claim 13, wherein the first frame frequency is 60 Hz or lower.

15. The head-mounted display of claim 10, wherein Δnd is 0.33 μm or more when transmittance of the liquid crystal layer is maximum.

16. The head-mounted display of claim 10, wherein
rotary viscosity coefficient γ1 of the liquid crystal material, elastic constant K11 of divergent deformation, and Δnd satisfy an expression mentioned below $$\gamma 1/(\Delta n^2 * K11)<650.$$

17. The head-mounted display of claim 10, wherein Δnd is more than 0.30 μm and less than 0.32 μm.

18. The head-mounted display of claim 10, wherein the refractive anisotropy Δn is more than 0.12 and less than 0.14.

* * * * *